United States Patent [19]
Poilleux

[11] 3,792,928
[45] Feb. 19, 1974

[54] FIBER OPTICS DISTANCE CONVERTING TECHNIQUE

[75] Inventor: Jean - Loup Poilleux, Vanves, France

[73] Assignee: Compteure-Schlumberger, Montrouge, France

[22] Filed: Feb. 28, 1972

[21] Appl. No.: 230,011

[52] U.S. Cl. .................. 356/4, 356/161, 250/227, 350/96 B
[51] Int. Cl. ............................................. G01c 3/08
[58] Field of Search ............ 356/1, 4, 161; 250/227; 350/96 B

[56] References Cited
UNITED STATES PATENTS

| | | | |
|---|---|---|---|
| 3,327,584 | 6/1967 | Kissinger | 250/227 |
| 3,297,875 | 1/1967 | Garwin et al. | 250/227 |
| 3,573,773 | 4/1971 | O'Hanlon | 350/96 B |

Primary Examiner—Maynard R. Wilbur
Assistant Examiner—S. C. Buczinski
Attorney, Agent, or Firm—William R. Sherman; Stewart F. Moore

[57] ABSTRACT

According to an illustrative embodiment of the invention, a technique is described for producing signals varying as a function of the distance of a surface relative to a reference face, comprising transmitting a beam of coherent light to an admitting end of a fiber optic bundle to transmit light to a reflecting surface opposite an emitting end of the bundle. A fiber optic receiver bundle having at least one receiving end for picking up light reflected by the surface is provided for transmitting a flux of reflected light to produce a signal related to this relative distance by a linear relationship over a certain range of variation of such distance. Such range may be varied by varying the angle of incidence of the coherent light beam on the admitting end. The receiving end may be transversely separated from the emitting end by an amount selected in accordance with a desired angle of incidence and a predetermined range. For the purpose of measuring the thickness of transparent bodies as measured by the distance between an outer and an inner face thereof opposite the emitting end, first and second respective receiving ends are provided such that light reflected by the inner face cannot be picked up by the first receiving end and vice-versa. A simple technique for determining the effects of variations of reflectivity of a light reflecting surface is also disclosed.

21 Claims, 20 Drawing Figures

FIBER OPTICS DISTANCE CONVERTING TECHNIQUE

The present invention relates to optical distance converting techniques particularly those where optical guide means such as fiber optics of glass or plastic, for example, are used to produce a signal varying as a function of the distance between a reference face and at least one light reflecting surface. Such a signal can be used for various purposes such as direct or indirect distance reading, process control, processing with other similar signals to obtain an indication of distance between two light reflecting surfaces, or other processing.

Fiber optics converters are already known, for example, for measuring small displacements of objects subjected to vibrations. Such converters typically comprise a first bundle of optical fibers which transmits light from a source to a surface under test, the distance of which surface is to be sensed and measured. A luminous flux of light reflected by the surface is picked up by a second bundle of fibers having a receiving end opposite the surface and a light signal output end adjacent to a photoelectric detector which furnishes an output signal S. The characteristic response curve S ($d$) representing the variations of the signal S as a function of the distance $d$ between the surface tested and a reference face on the converter has a linear zone over a distance range of width $\Delta_o$ in which the converter is particularly well-suited for use.

If the second bundle of fibers picking up the reflected light is juxtaposed to the first bundle which illuminates the surface, the origin of the characteristic curve S ($d$) where S starts to increase from $S=0$, is obtained for $d=0$. If however the second bundle has its receiving end separated from the light emitting end of the first bundle by a determined amount, the origin of the curve S ($d$) where S starts increasing from a value $S=0$ is found at a discrete distance $d_t$ which depends on the amount by which the receiving end is separated from the emitting end. This is explained in some detail in the copending United States Patent Application Ser. No. 195,765, filed on Nov. 4, 1971 by Rene Brelot and Jean Tourret.

In the same application there is shown how the above principles can be used for measuring the thickness of a transparent body. A first signal representative of the distance of the outer face of such a body facing the emitting end of a light transmitting fiber bundle is produced by picking up light reflected thereby with the receiving end of a first fiber bundle receiver. A second signal representative of the distance of the inner face of such body facing the same emitting end is produced by picking up light reflected thereby with the receiving end of a second fiber bundle receiver differently spaced from the emitting end than the first receiver bundle. The thickness of the body as represented by the distance between the inner and outer faces thereof can be obtained by combining the respective first and second signals.

In all the preceding cases, the range of linear variation of a signal S ($d$) is determined by the type of light source used with the transmitter bundle of fibers, the shape and dimensions of the fiber bundles, and their relative spacings. In particular, the width of the range and its midpoint are fixed by the above parameters.

It is an object of the present invention to increase the flexibility of the optical distance converting technique previously described to further extend the field of its metrologic applications, particularly, but not exclusively, with a view to provide accurate thickness measurement for transparent bodies in a large variety of conditions.

According to another aspect of the invention, it is a further object thereof to provide a technique for determining variations in the level of the reflectivity of a light reflecting surface advantageously for compensating measurement of distance from a reference face to such surface for variations in the reflectivity level thereof.

According to the invention, a beam of coherent light is transmitted to a light reflecting surface through optical guide transmitter means of an optical converter having receiver guide means for picking up reflected light and outputting a signal which is representative of the distance between the surface and the converter. The angle of incidence of a parallel beam of coherent light striking the surface can be selected to obtain a greater flexibility in determining a range of linear variations for the output signal as a function of distance. All the light rays of the coherent light beam reflected by the surface are oriented with the same angle with respect to the surface. Depending on the position of the receiver guide means with respect to the transmitter means, the light beam reflected by a surface at a given distance will strike a variable portion of these guide means or not strike them at all, thus producing a zero signal. This property can be used for producing two signals respectively representative of the distance of two spaced apart surfaces such as the outer and inner faces of a transparent body, these signals being produced by two distinct respective receiving means, without having light reflected by one such surface picked up by the receiver means assigned to the other surface.

The signal produced by a receiver means when the transmitter means projects coherent light onto a light reflecting surface with a given incidence has two ranges of linear variations with distance to the surface, one where the signal increases with distance with a positive slope and then another one where the signal after passing a peak value starts decreasing with distance with a negative slope having substantially the same value as such positive slope. According to another aspect of the invention, application is made of this feature for determining the reflectivity of the surface, mainly to correct the distance measurement of said surface for variations in reflectivity.

Further objects and aspects of the invention will become apparent from the following description made with reference to the accompanying drawings in which.

Figure 1:
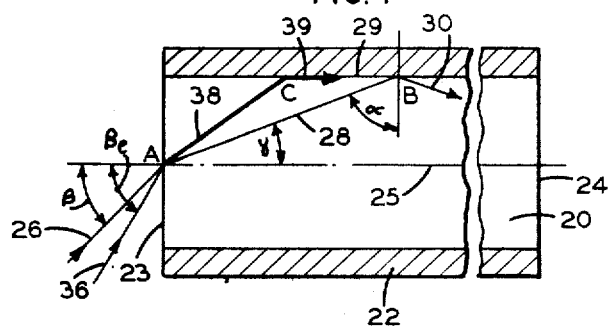
FIG. 1 illustrates the propagation of light rays in a glass optical fiber.

FIG. 1 shows a longitudinal cross section of a short length of a fiber optic comprising a core of glass 20 having an index of refraction n1 surrounded by a cladding 22 of glass having an index of refraction n2 smaller than n1. The fiber has two flat ends 23 and 24 perpendicular to the axis 25 of the fiber. FIG. 1 shows a light ray 26 entering the face 23 of the fiber at point A with an angle of incidence $\beta$, this angle of incidence being defined as the angle between the incident light ray 26 and the perpendicular (here 25) to the light admitting end 23 at the point of incidence A. The same definition is used throughout the present specification.

Figure 2:
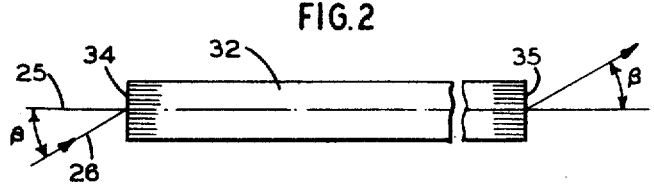
FIG. 2 shows the path of a light ray entering and leaving an optical fiber bundle.

The incident light ray is refracted by the glass of the core 20, the angle of refraction $\gamma$ being defined as the angle between the refracted ray 28 and the perpendicular (here 25) to the face 23 at point A and being governed by the laws of refraction. The refracted light ray 28 strikes the boundary 29 between the core 20 and the cladding 22 at point B with an angle of incidence $\alpha$ (Here $\alpha = \pi/2 - \beta$). Assuming $\alpha$ is large enough, the impinging ray 28 is totally reflected by the boundary 29 because $N_2 < N_1$. The reflected ray 30 is thus directed back across the core and strikes the boundary between the core 20 and cladding 22 again at a point, not shown, with the same angle of incidence. The light ray thus is propagated through the fiber by virtue of multiple reflections until it strikes the face 24 with and angle of incidence substantially equal to $\gamma$ so as to be refracted by the face 24 and leave the fiber with an angle of refraction substantially equal to $\beta$. This is illustrated by FIG. 2 where the light ray 26 is shown entering the fiber within a bundle 32 of identical fibers. The bundle 32 has an end 34 at which the light ray is emitted and an end 35 where it is exited.

Turning back to FIG. 1 a light ray 36 can be found which strikes the end 23 with an angle of incidence $\beta_e$ such that the refracted ray 38 which meets the cladding at point C, instead of being totally reflected, is refracted at 39 along the boundary 29 between the core 20 and the cladding 22 (angle of refraction of 90°). Any incident ray having a greater angle of incidence than $\beta_e$, instead of being reflected by the boundary 29, will be refracted in the cladding. Thus $\beta_e$ defines an upper limit for the incidence of any light ray entering the fiber for direct propagation through the core 20:

$$\sin \beta_e = \sqrt{n_1^2 - n_2^2}$$

Sin $\beta_e$ is called the "numerical aperature" of the fiber.

Figure 3:
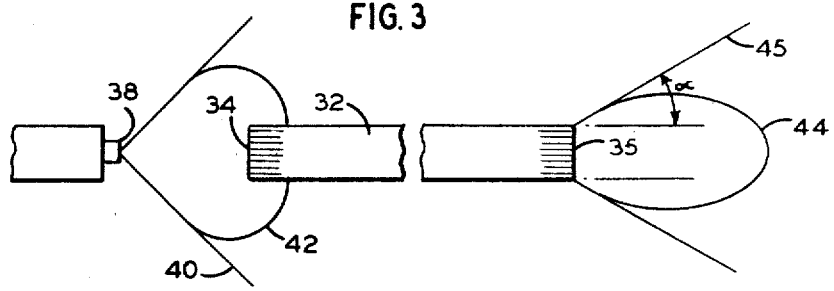
FIG. 3 illustrates a beam produced by a conventional source of light before and after travelling through a bundle of fibers.

FIG. 3 illustrates what happens if, instead of considering one light ray striking the admitting end 34 of the fiber bundle 32, one considers a conventional source of light 38. Such light source may be a filament lamp or an electro-luminescent diode or the like. Under normal conditions, the light conductors associated with such a source will emit a divergent beam of light in the direction of the fiber bundle. The emergent rays of this beam are contained in a cone 40 of light whose half-angle is most often in the neighborhood of 30°. The emission lobe of such a source is shown at 42. Such emission lobe or emission characteristic is obtained by drawing in each direction from the source 38 a vector having a magnitude proportional to the intensity of the light emitted in this direction. The ends of all these vectors define a surface which represents the emission characteristic of the source, the curve 42 being a longitudinal section of such surface.

The light flux admitted into the bundle of fibers 32 is propagated therethrough and an emission lobe 44 can be drawn for the light emerging from the end 35 of the bundle 32. The emerging rays are contined within a cone 45 having a half-angle, as shown in FIG. 3, which is not quite as open as the cone 40. The emission lobe 44 can be drawn in the same manner as explained for the source 38. Thus FIG. 3 shows that the light emerging from the end 35 is scattered throughout the cone 45.

Figure 4:
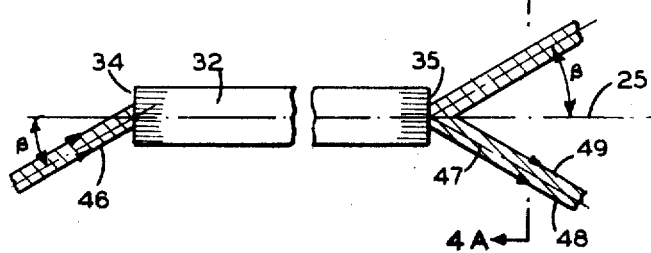
FIG. 4 illustrates the behavior of a beam of coherent light travelling through a bundle of fibers.
Figure 4A:
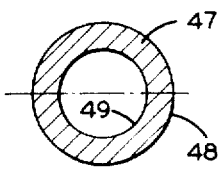
FIG. 4A is a cross-sectional view taken along line A-A of FIG. 4.

FIG. 4 illustrates the use of the same fiber bundle 32 with an incident parallel beam 46 of coherent light issued from a laser source (not shown) and striking the admitting end 34 with an angle of incidence $\beta$. The light propagated through the fiber bundles 32 exits from the end 35 as a beam 47 represented in FIG. 4, which is limited outwardly by a cone 48 and inwardly by a cone 49, both cones having a half-angle equal to $\beta$. A cross-section of the beam 47 by a plane A—A perpendicular to the axis 25 is shown on FIG. 4A. The shape of this cross-section is annular so that the space inside cone 49 receives substantially no light from the fiber bundle. Thus by using coherent light in connection with a fiber bundle it is possible to obtain an output beam oriented in a selected direction which direction is adjustable by modifying the angle of the incident beam. The following description will show how this property can be used according to the invention in connection with a fiber optics converter. It should be noted here, however, that for an angle of incidence equal to zero, the beam of light emerging from the end 35, has a shape substantially similar to the one of FIG. 3 for a non-coherent light beam.

A typical fiber optics converter, described with reference to FIG. 5, has a bundle 50 of optical fibers oriented perpendicular to a surface 51 under test. Light from a light source denoted by an arrow 54 s admitted at its remote end 50Y and emitted through its end 50Z toward the surface 51 spaced by a distance $d$ from this emitting end. The surface 51 has some light reflecting power. It is desired to detect the relative displacements of this surface by sensing the variations of its distance to the emitting end 50Z. The bundle 50 or transmitting bundle is associated with a further bundle of fibers 52 or first receiver bundle which directs a flux of light reflected by the surface 51 towards photoelectric detector 53, for example, a photo transistor, a photo diode or a photo resistor, when this surface 51 is illuminated by the transmitting bundle 50. The detector 53 furnishes an electrical signal S providing a measurement of the variations in the distance $d$ between the converter and the test surface 51.

The first receiver bundle 52 has a light receiving end 52Z juxtaposed to the emitting end 50Z which faces the surface 51 to pick up the light reflected thereby. These ends 50Z and 52Z are part of the sensing head 60 of the converter. The light flux transmitted by the bundle 52 emerges from a light output 52Y as indicated by arrow 55 toward the detector 53. This receiving end may be comprised of several elementary ends of corresponding elementary bundles merging into a complex receiver bundle 52 for transmitting the reflected light flux to a common output 52Y.

Figure 5:
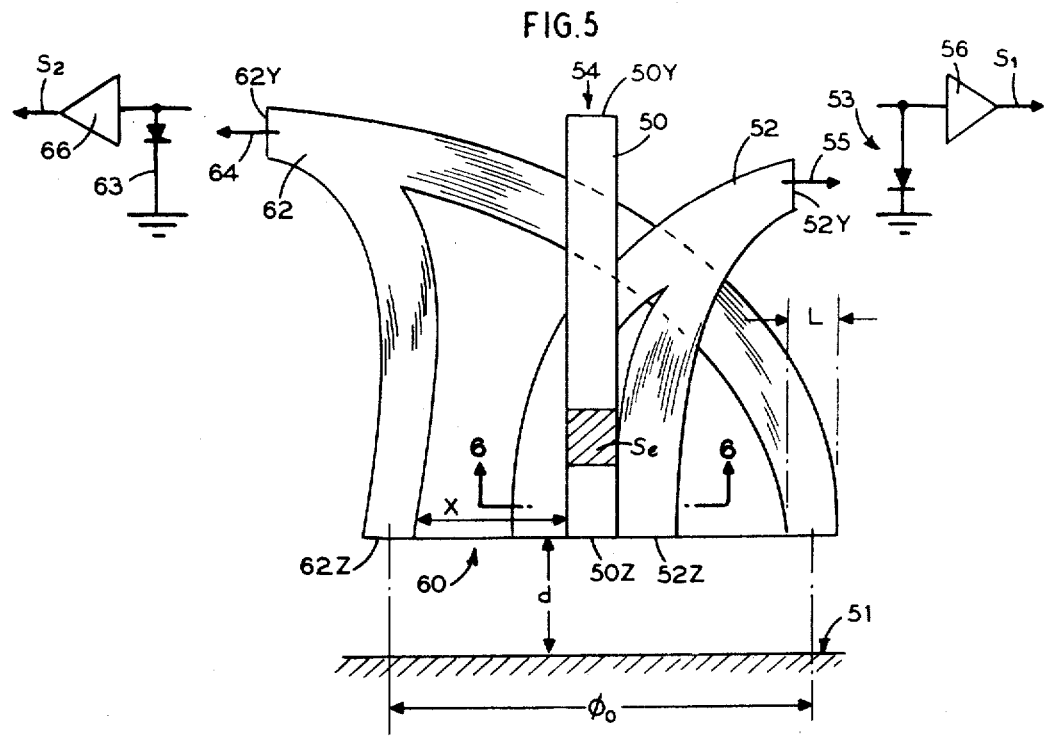
FIG. 5 shows a typical fiber optic distance converter.
Figure 6A:
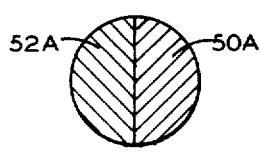
FIGS. 6A to 6E show examples of various possible arrangements for the fiber bundles of a fiber optics converter.
Figure 6B:
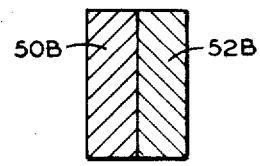
Figure 6C:
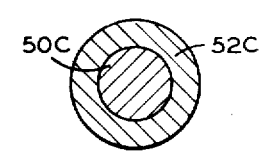
Figure 6D:
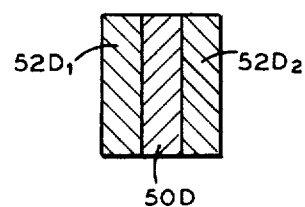
Figure 6E:
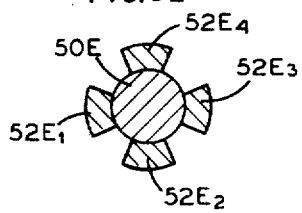

FIGS. 6A to 6E diagrammatically show cross-sections of juxtaposed transmitter and receiver bundles of such an optical converter in the vicinity of the emitting and receiving ends of these bundles. FIGS. 6C to 6E show a section along line VI—VI of a converter of the type represented on FIG. 5. In FIGS. 6A and 6B, respectively, semi-circular and rectangular transmitter and receiver bundles 50A, 50B and 52A, 52B are juxtaposed along a junction plane, whereas a tubular receiving bundle 52C surrounds a cylindrical transmitting bundle 50C in FIG. 6C. In FIG. 6D, a transmitting bundle 50D is sandwiched between two elementary receiver bundles 52D$_1$ to 52D$_2$ whereas in FIG. 6E four elementary receiver bundles 52E$_1$ to 52E$_4$ are distributed around the cylindrical transmitting bundle 50E.

Figure 7:
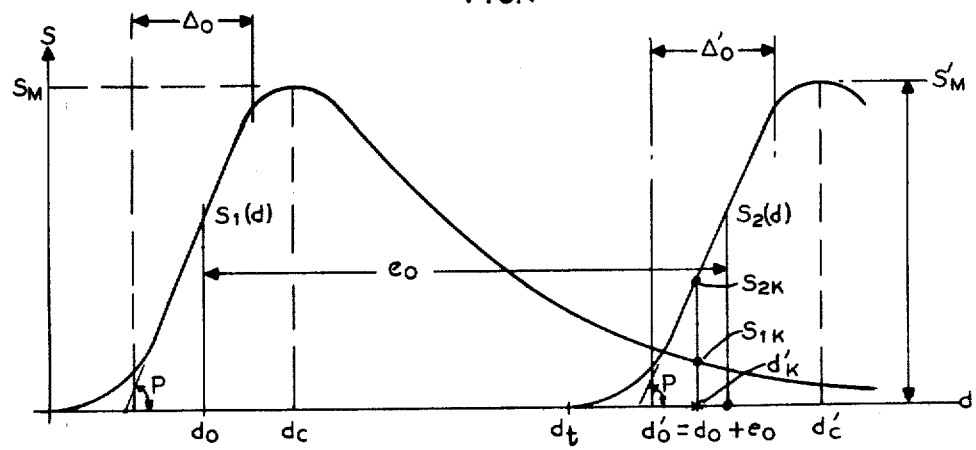
FIG. 7 is a diagram of characteristic response curves of the converter of FIG. 5 with a conventional light source.

The diagram of FIG. 7 shows the characteristic response curve for the signal $S_1$ ($d$) which can be obtained from the detector 53 after adequate amplification through an amplifier 56. The signal $S_1$ is proportional to the amount of light available at the output end 52Y, such amount varying with the distance $d$ between the surface 51 and the sensing head 60 of the converter. The curve S of FIG. 7 is the one obtained when the admitting end 50Y of the transmitter bundle 50 is illuminated with a conventional light source such as a filament lamp or an electro-luminescent diode where indicated by arrow 54.

This curve comprises a linear zone having a positive slope in a distance range $\Delta_o$, centered about a mid-range distance value $d_o$, in which the converter is used. The geometry of the bundle of fibers, some examples of which have been discussed with reference to FIGS. 6A to 6E, and their dimensions determine this characteristic, in particular the extent of the zone $\Delta_o$, the maximum amplitude S$m$ and the value $d_c$ of the corresponding distance. Under these conditions, the mean frontal distance of a converter, i.e., the value of the mid-range distance $d_o$ sometimes referred to later as its "frontal" for short, its sensitivity (slope of the linear zone), its measurement range $\Delta_o$, and consequently its accuracy are not independent parameters. Moreover, it can be seen that the origin of the characteristic curve is situated at a distance $d=0$ wherefrom the signal $S_1$ increases practically as soon as the distance $d$ starts increasing.

Turning again to FIG. 5, there is shown a second receiver bundle of fibers 62 having a light receiving end 62Z in the plane of receiving ends 50Z and 52Z (sensing head 60) and a light output end at 62Y to transmit light picked up by the receiving end 62Z to a photoelectric detector 63 denoted by arrow 64. The detector 63 is followed by an amplifier 66 to produce a signal $S_2$. The receiving end 62Z is annular and surrounds both ends 52Z and 50Z, the distance between the inward looking boundary of the end 62Z and the boundary of the end 50Z being denoted by X. Also, in the example depicted by FIG. 5, the receiving end 62Z is actually separated from the lateral boundary of the receiving end 52Z by a discrete gap. The annular end 52Z could be made of a circular series of elementary receiving ends equally spaced from the emitting end 50Z, these elementary bundles merging to form a complex bundle such as 62. Also, the end 62Z may be made of two opposite elementary receiving ends symmetrically disposed with respect to the emitting end 50Z.

Here the distance X between the receiving end 62Z and the emitting end 50Z of the transmitting bundle 50 introduces a new parameter affecting the characteristic curve of the signal $S_2$ ($d$) (FIG. 7) which can be obtained from the amplifier 66 where the distance between the head 60 and the surface 51 varies in a range which is located at a greater distance away from the head 60 than the range of variation of $S_1$. The curve $S_2$ shown on FIG. 7 is obtained by illuminating the admitting end 50Y with light from a conventional source as indicated for $S_1$.

Referring again to FIG. 5, the mean diameter $\phi_o$ of the annular receiving ring 62Z (or the distance X) determines the frontal distance $d'_o$ of the converter which is greater than $d_o$. The width L of the receiving ring determines the extent $\Delta'_o$ of the distance range of linear operation (FIG. 7). The maximum value $S'm$ of the signal $S_2$ when $d=d'_c$ is a function of the luminous flux transmitted, hence of the transverse cross-section $S_e$ of the transmitting bundle 50, and of the ratio of the transverse cross-section of the receiving bundle 62 to the total cross-section of the converter. FIG. 7 shows that in this case the "origin" of the characteristic curve $S_2$, or distance $d_t$ where a signal can be detected, may be quite different from zero.

It can be understood that by adjusting the three parameters $\phi_o$, L and $S_e$ defined above, it is possible to use a series of receiving bundles providing the converter with an adjustable frontal distance $d'_o$, all with the same measurement range $\Delta_o$, and the same sensitivity (which is a function of $\Delta_o$ and $Sm$). For this purpose, the knowledge of $\Delta_o$ permits L to be obtained. The choice of the value $d'_o$ determines the diameter $\phi_o$ to use. In order to compensate for a certain loss of sensitivity which occurs when the receiving end is moved away from the emitting end, the cross-section $S_e$ may be increased for compensation. As an alternative, the value of the sensitivity can also be adjusted by acting on the gain of the preamplifier 66 connected at the output of the photoelectric detector 63. In the example illustrated by FIG. 7, both curves $S_1$ and $S_2$ have the same slope $p$ in their linear portion by proper adjustment of the gains of preamplifiers 56 and 66 of FIG. 5. Also the range $\Delta_o$ and $\Delta'_o$ are the same by the choice of the widths of both receiving ends 52Z and 62Z. The distance between the average frontal distances $d'_o$ and $d_o$ is referred to as $e_o$.

Application of the preceding remarks can be made for constructing converters having a series of receiver bundles spaced by increasing amounts from the transmitter bundle. If these receiver bundles are juxtaposed with respect to each other from the emitting end toward the periphery of the converter head, the linear portions of the characteristic curve of each one of them do not normally overlap. Overlapping linear portions can be obtained, however, by providing at least two series of juxtaposed receiver bundles, one series being offset with respect to the other in the direction of the emitting end by an amount equal to half the width of one receiving end. Thus any "blind" zone or distance range in which no linear variation of at least one signal from the receiver bundles can be found is avoided. Preferably, the sensitivity of all these receiver bundles is adjusted so as to be identical. Further details on the use of such converters are given in the abovementioned copending application Ser. No. 195,765, filed on Nov. 4, 1971 by Rene Brelot and Jean Tourret.

It can be seen that in the previously described cases, once the source as characterized by its emission characteristic, the geometry of the fiber bundles and the spacing X are given the average frontal distance $d'_o$ and the range $\Delta_o$ of the linear part of the characteristic curve are both determined.

Assume now that instead of using a conventional light source for illuminating the admitting end 50Y of the transmitter bundle 50 of FIG. 5, a laser source is used for transmitting a parallel beam of coherent light to this admitting end with a certain angle of incidence $\beta$. It results from the previous explanations with reference to FIGS. 3 and 4 that a corresponding beam will be transmitted by the emitting end 50Z to the surface 51, all the rays of such beam striking the surface 51 with the same angle of incidence $\beta$, assuming that the surface 51 is parallel to the flat sensing head 60 of the converter. At one spot on the surface 51, the incident beam (having the shape of beam 47 of FIG. 4) will be reflected in a single direction, and only receiving ends of receiver bundles in that direction will pick up light from this surface to produce a signal representative of the distance thereof.

Figure 8:
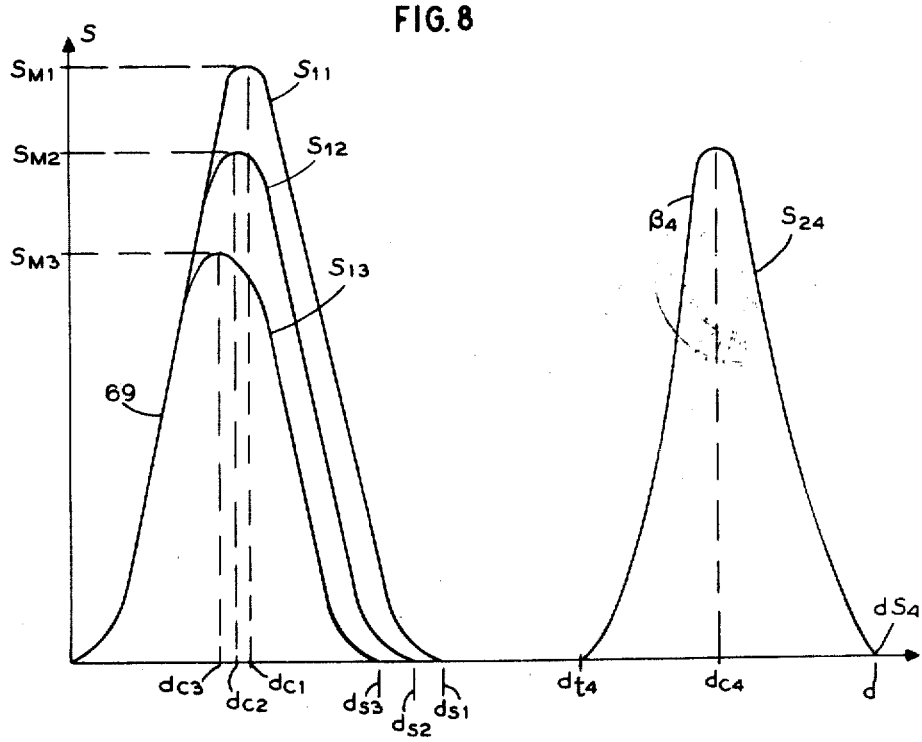
FIG. 8 is a diagram of characteristic curves for the converter of FIG. 5 with a coherent light source.

Looking first to what happens with a receiver bundle such as 52 juxtaposed to the emitting end as shown in FIG. 5, the curves $S_{11}$, $S_{12}$, $S_{13}$ of FIG. 8 are characteristic curves representing the variation with the distance $d$ of signal $S_1$ from preamplifier 56, respectively, for three different decreasing values $\beta_1$, $\beta_2$, $\beta_3$ of the angle of incidence of the coherent light beam on the light admitting end 50Y. Interestingly, each one of these curves is symmetrical, having a first linear portion of positive slope, a peak and a second linear portion of negative slope with the same absolute value as the first linear portion. All the curves $S_{11}$, $S_{12}$, $S_{13}$ start increasing from point 0. ($S=0$, $d=0$) and their first linear portions have a common section shown at 69. Each of these curves, after reaching its own peak value $Sm1$, $Sm2$, $Sm3$, respectively, for distances $dc1$, $dc2$ and $dc3$, decreases to reach a zero value for $ds1$, $ds2$, $ds3$, respectively, at points substantially symmetrical from the origin 0 with respect to $dc1$, $dc2$ and $dc3$ along the $d$ axis.

Figure 9:
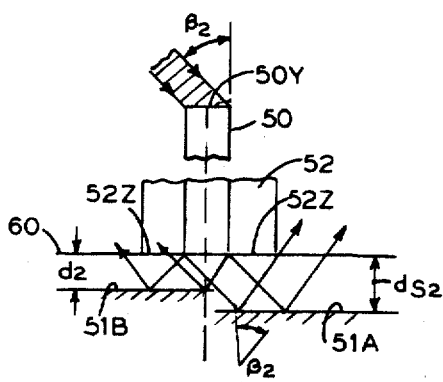
FIGS. 9 and 10 illustrate the travel of coherent light beams emitted by a converter and reflected by light reflecting surfaces at various distances.

FIGURE 9 shows, for an angle of incidence $\beta_2$ of a coherent light beam at the admitting end 50Y, the reflection of the beam issued from the emitting end 50Z on a surface 51A at distance $ds2$ from the head face 60 for which $S_{12} = 0$, and on a surface 51B at a distance $d2$ near $dc2$ where the signal is maximum. Indeed, it may be seen that a large portion of the beam reflected by the surface 51B is picked up by the receiving end 52Z whereas the beam reflected by surface 51A with the same angle $\beta_2$ just misses the receiving end 52Z and thus produces no signal in the receiver bundle 52.

Turning back to FIG. 8, the curve $S_{11}$ having the maximum peak amplitude should be obtained for an angle of incidence $\beta$ equal to zero. However, it has been explained hereinbefore that for that particular value of $\beta$ the transmitting fiber bundle looses its directivity. Thus if an incident beam having a sharply defined incidence on the surface is desired, other values of $\beta$ should be chosen, a particularly suitable value of $\beta$ for many applications of the kind which will be described having around 30°. If the angle of incidence of the coherent light beam increases from zero to the limit value $\beta_r$ of the numerical aperture, the peak amplitude Sm of the corresponding curve decreases, as well as the distance $dc$, this being verified by looking at FIG. 9 and observing that, if $\beta$ is increased, the surface 51B will have to be brought closer to the receiving end 52Z in order to maintain substantially the same level of illumination thereof.

If the receiver bundle is separated from the transmitter bundle, instead of being juxtaposed to it, as is the case for the receiver bundle of FIG. 5 separated by X from the emitting end 50Z, the shape of the characteristic $S_{24}$ curve is as illustrated in FIG. 8 for a given distance X and an angle of incidence $\beta$ 4.

Figure 10:
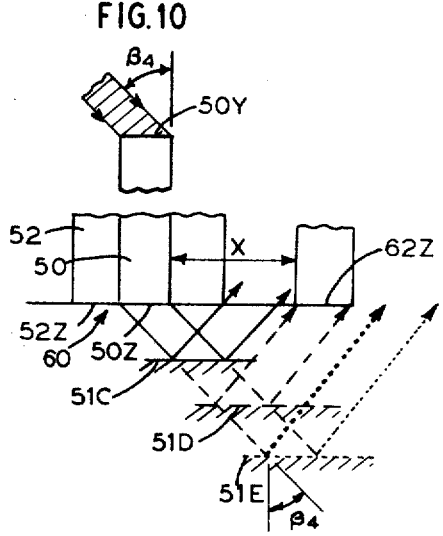

FIG. 10 illustrates operation of the converter when the admitting end 50Y receives a beam of coherent light with the angle of incidence $\beta$ 4. A surface 51C close to the sensing head 60 reflects the transmitted beam without reaching the receiving end 62Z. A surface 51D further away reflects the transmitted beam so as to fully illuminate the end 62Z, and that light reflected by a surface 51E still further away does not reach the end 62Z at all. Thus the origin $dt_4$ of the curve is shifted along the $d$ axis and, for each value of X, a set of curves corresponding to various values of $\beta$ can be made. Generally speaking, the utilization of a laser beam introduces a new parameter which permits further adjustment of the range and the average frontal distance of the linear portion of the characteristic for a receiving bundle, all other conditions being equal. Furthermore, all these characteristic curves have a second linear portion of opposite slope.

Figure 11:
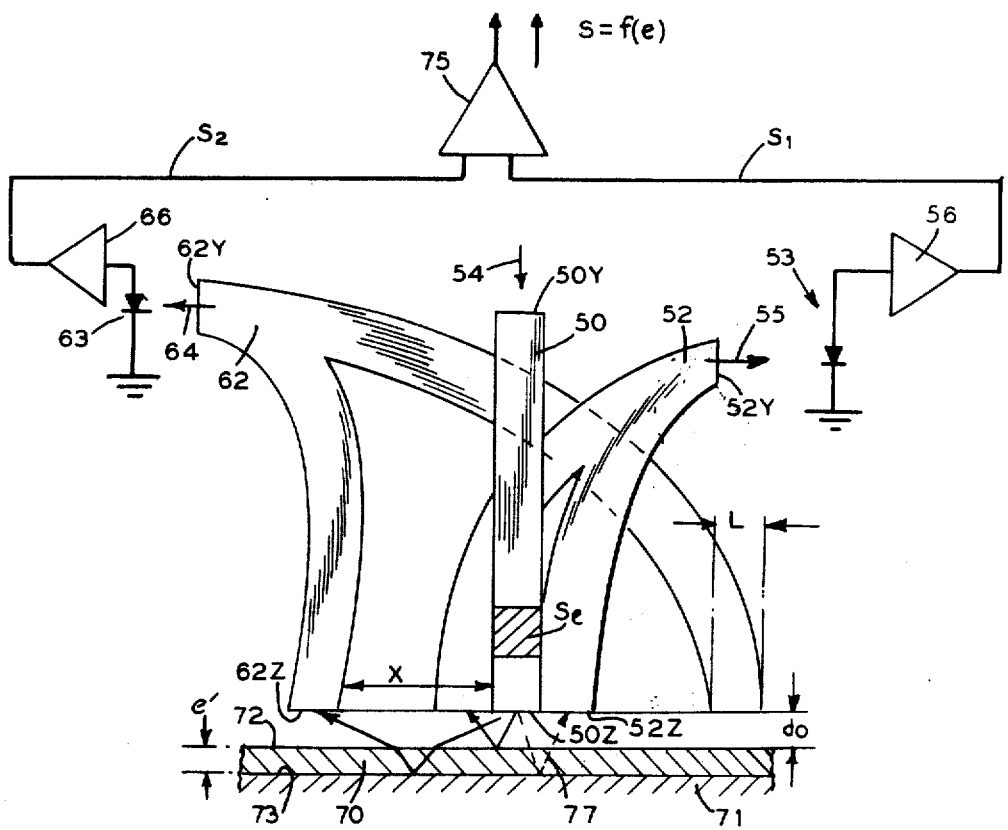
FIG. 11 shows the converter of FIG. 5 adapted for measuring the thickness of a transparent body.
Figure 12:
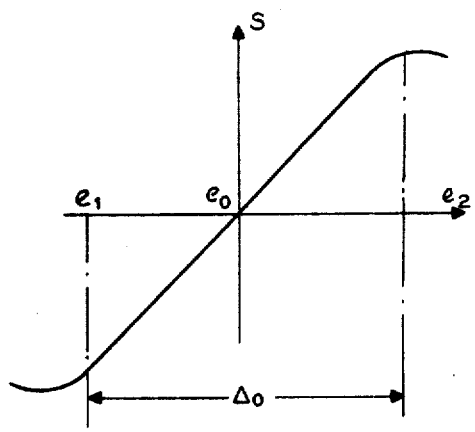
FIG. 12 shows a characteristic thickness curve obtained with the converter of FIG. 11.

Turning now to FIG. 11 there is shown the same converter as in FIG. 5, with the same reference numerals but used for measuring the thickness of a plate 70 of a transparent material such as glass resting on a flat norizontal support 71. The plate 70 may be of glass floating on a bath of melted tin 71 as found in the float-glass manufacturing process. Facing the head 60 of the converter are the upper or out er faces 72 of the glass and the lower or inner face 73 thereof in contact with the support 71 which may be highly reflective as in the case of tin. The thickness of the glass plate is $e'$ which can be considered as equivalent to the thickness $e$ of a slice of air which would have to replace the plate of glass to have the same effect upon the rays reaching the receiving ends of the receiver bundles. In other words, $e=ne'$ n being the refraction index of the glass with respect to air, the light rays traversing the slice of air without refraction. $d_o$ is the average distance from the head 60 to the upper surface 72. The outputs $S_1$ and $S_2$ of the converter are coupled in the case FIG. 11 to a differentitial amplifier 75 which provides a signal S function of $e$, as shown by the curve of FIG. 12. A brief look at FIG. 7 shows that if $d_o$ is the average value of the frontal distance $d$, and $e_o$ the average value of the equivalent thickness $eo$, then the difference $S=S_2 - S_1$ for each pair of distance values $d$ and $d+e$ provides a measurement of the equivalent thickness $e$ throughout the range of linear variation of the two characteristics (such range having a width $\Delta_o = \Delta'_o$) as illustrated by FIG. 12, when the converter of FIG. 11 is illuminated by a conventional light source. However, it should be noticed that the relationship illustrated by FIG. 12 is true only in the case where the average thickness $e_o$ is large enough so that the curves $S_1$ and $S_2$ are far apart. Indeed, turning back to FIG. 7, if the inner face 73 is at a distance $d'_k$ from the sensing head 60, it can be seen that the light signal received by the receiving end 62Z is $S_{2k}$ but that a residual signal $S_{1k}$ is also received by the receiving end 52Z as shown in dotted line for a light ray 77 reflected by the face 73 in FIG. 11. The more the curve $S_2$ tends to overlap the decreasing portion of $S_1$, as when the thickness eo is relatively small, the larger the signal $S_{1k}$ will be. Moreover, if the reflecting power of the inner face 73, hereinafter referred to as reflectivity, is large, the parasitic signal $S_{k1}$ may be quite significant thus completely invalidating the linear portion of the S curve over the range $\Delta_o$ between $e_1$ and $e_2$ a useful representation of $e$.

Figure 13:
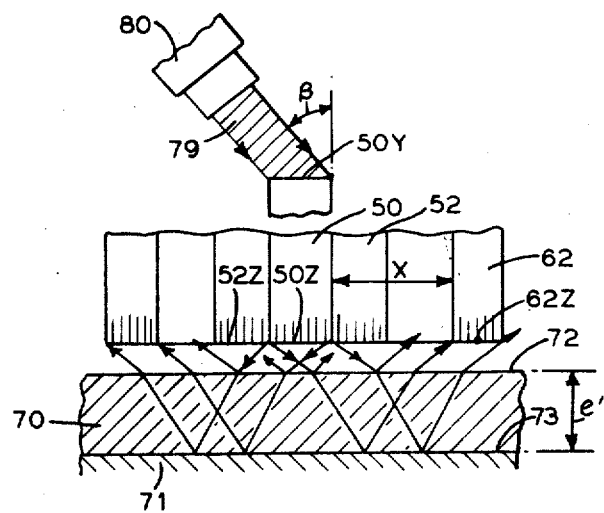
FIG. 13 illustrates the path of coherent light beams with a converter such as depicted by FIG. 11.

FIG. 8 clearly illustrates how this problem can be overcome by using a laser beam in accordance with the invention. In the example given, the curves for the juxtaposed receiver bundle 52 and the separated receiver bundle 62 do not interfere. It can be assumed here that $\beta_2$ and $\beta_4$ are equal, i.e., that $S_{12}$ and $S_{24}$ are the respective curves obtained for these receiving bundles when the admitting end 50Y is struck by a laser beam at an angle $\beta = \beta_2 = \beta_4$. No distance $d$ can be found for a surface 51 where both receivers produce a signal simultaneously. FIG. 13 helps to visualize this by showing a coherent light beam 79 emitted by a laser source 80 and the light rays issued from the boundaries of the emitting end 50Z which are reflected and refracted by the plate 70. No light ray reflected by the upper face 72 can reach the receiver bundle 62 separated by the distance X from the transmitter bundle 50. Conversely, no light ray refracted by the face 72 and reflected by the inner face 73 is received by the juxtaposed receiver bundle 52. The distance X and the angle $\beta$ have been chosen with respect to the average thickness $e'_o$ of the plate and the average frontal distance $do$ of the upper face 72 so that the receiving end 62Z receives light from the face 73. In this case, the converter of FIG. 11 will provide a signal S having a linear variation as a function of the thickness of the plate of glass over a certain range so as to furnish a true representation of such thickness.

Thus, the use of a laser beam permits one to separate very sharply signals produced by one face and signals produced by another face of the plate. The characteristic curves for each receiver bundle extend over a distance range such as $d_{s1}$, $d_{s2}$ or $d_{s3}$ for the receiver bundle 52 which is sufficient to provide a useful portion of linear variation but limited enough so that the curve will not in practical cases overlap the curve of another receiver bundle differently spaced from the transmitter bundle. That the characteristic curves for receiver bundles such as 52 and 62 can be well separated will be understood by looking at FIGS. 9 and 10 and considering that, for a given $\beta$, the distance range within which the receiving end picks up a signal is much more limited than the same range in the case where a conventional light source is employed. In the latter case the range for picking up a signal is the same as if $\beta$ were allowed to vary extensively within the same beam of light striking the reflecting surface. Such range is thus wider than several ranges of variation for one given $\beta$ only.

Moreover, as the need may arise, the range over which a signal is received by a receiver bundle may be varied by properly choosing the angle of incidence $\beta$ of the laser. Therefore, it is possible even for small thickness of the plate to obtain responses from each receiver bundle which are dependent upon reflections of one face only. It should also be noticed that an increase in reflectivity of one face may boost ythe peak of the corresponding curve but does not increase the width of the curve (distance range over which a light signal is picked up) thus leaving the curves corresponding to the respective faces of the plate free of overlapping whatever their reflectivity may be.

Thus, given a particular thickness to control, for example, in a float-glass manufacturing process, a converter can be designed, or a couple of receiver bundles of a multireceiver converter can be selected, according to the following procedure given by way of example.

First, starting with a receiver bundle such as 52 juxtaposed to the transmitter bundle for sensing the upper face of the plate, a determination of the distance X separating the second receiver bundle for sensing the inner face of the plate is made by considering all curves $S_2$ ($d$) for a laser beam incidence such as $\beta + 30°$. X is determined by the knowledge of $d'_o = d_o + e_o$, i.e., the average distance from the head 60 to the upper face 72 plus the average equivalent thickness $eo$. This being done, the converter may be set in position above the plate, and a fine adjustment of the angle of incidence $\beta$ of the laser beam can be effected to compensate for slight inaccuracies in adjusting the distance do, for example.

Of course, if there is any other reason to depart from the indicated value for $\beta$, it is always possible to do so.

Figure 14:
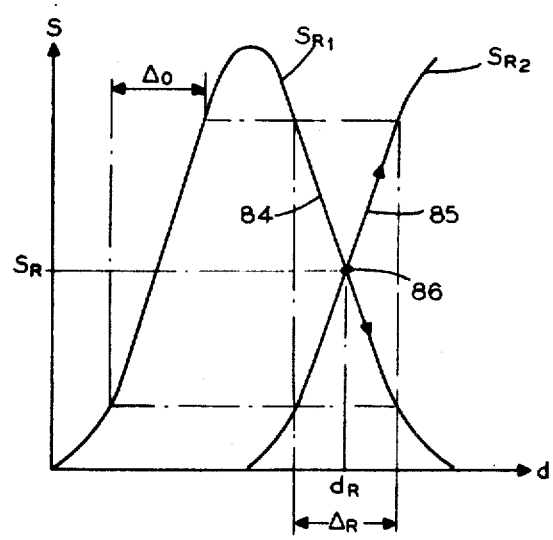
FIG. 14 is a diagram of curves for explaining the principle of reflectivity determination.

FIG. 14 is a diagram of two symmetrical characteristic curves for $S_{R1}$ and $S_{R2}$ obtained with a converter of the type described with reference to FIG. 5 when illuminated with a properly inclined laser beam. The signal $S_{R1}$ is produced by a receiver bundle juxtaposed to the transmitter bundle and, accordingly, the corresponding curve has its origin at point . ($S=0$, $d=0$). The signal $S_{R1}$ is produced by a receiver bundle spaced from the transmitter bundle by a distance $X_R$ selected so that, for chosen incidence angle of the laser beam, the linear portion of negative slope 84 of $S_{R1}$ and the linear portion of positive slope 85 of $S_{R2}$ are obtained within the same distance range $\Delta$ R centered about the mid-range distance $d_R$ for which both $S_{R1}$ and $S_{R2}$ take the same value S (crossing point 86 of both curve). Adjustment of these positive and negative slopes to have the same numerical value can be done by proper adjustment of the sensitivity of both receiver channels, for example, by adequate amplification of the signals produced by the detectors 53 and 63. As indicated, the curve $S_{R2}$ has its origin at a point different from $d=0$.

It can be seen that if a reflecting surface is located within the range $\Delta$ R and both signals $S_{R1}$ and $S_{R2}$ are summed, the resulting signal will keep a constant value whatever the distance variations of the surface within such range $\Delta$ R may be.

The value of this sum signal which is $2S_R$ in the case of FIG. 14 only depends on the reflecting power of the surface under consideration. This reflecting power is measured by the coeffeicient of reflection of the surface and any variation thereof will cause a modification of the values $S_{R1}$ and $S_{R2}$ for each distance and consequently a change in their sum. It can thus be understood that within the distance range $\Delta R$, the value of the sum signal defined earlier is only dependent on the reflectivity of the surface.

Having thus obtained a determination of the reflectivity, it is possible to use the latter for correcting the values of distance measured where the reflectivity of the surface varies. It can be understood that if for a given distance the reflectivity of the surface increases, the value of the signal S will be boosted by an amount which is half the increase in the previously discussed signal $S_{R1} + S_{R2}$, assuming the surface if in the range $\Delta R$.

Figure 15:
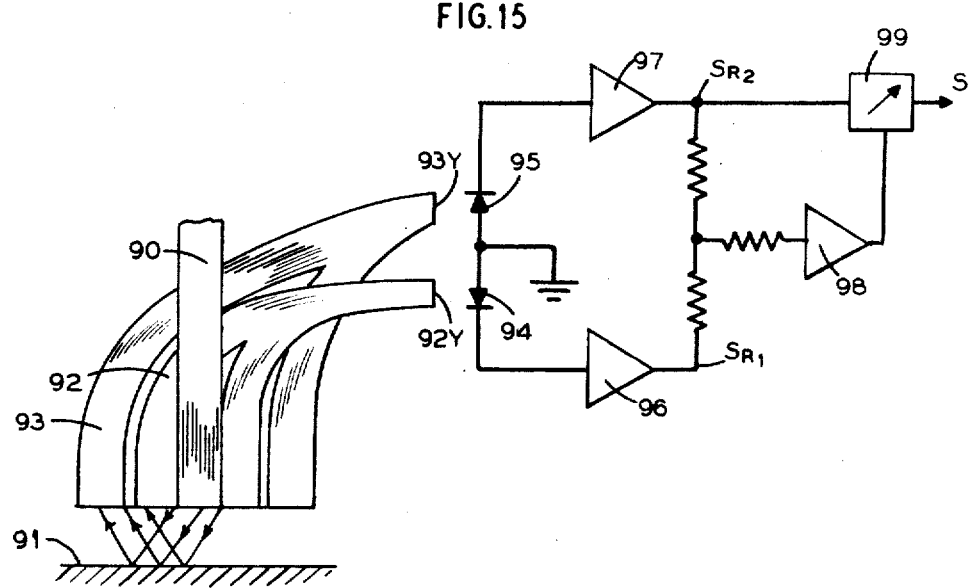
FIG. 15 illustrates the measurement of distance with a converter having means for compensating for variations of reflectivity.

FIG. 15 illustrates how this can be done in the case presented in FIG. 14. A transmitter bundle 90 directs light toward a surface 91 within the range $\Delta R$. and two receiver bundles 92 and 93 produce respective signals $S_{R1}$ and $S_{R2}$ after amplification by two preamplifiers 96 and 97 coupled to photodetectors 94 and 95 detecting the light from the output ends 92Y and 93Y of the receiver bundles.

Signals $S_{R1}$ and $S_{R2}$ vary according to the diagram of FIG. 14 and are summed up in a summing amplifier 98. The signal $S_{R2}$ is amplified by a variable gain amplifier 99, the gain of which is controlled by the value of the output signal of the amplifier 98 in such a way that its gain is decreased when the output signal of the amplifier 98 increases so as to maintain the value of the signal S at the output of amplifier 99 constant when the distance of the surface does not vary but its reflectivity does. Thus the signal S will be fully representative of the dostance in the range $\Delta R$.

This correction may be useful in the case previously discussed of measurement of the thickness of a plate of glass floating on a melted reflecting material such as tin.

Moreover, in such a case it might be desirable to prevent the optical converter from being influenced by parasitic radiation fluxes such as may be emitted by a furnace or the like used in th manufacturing process. Here again the use of laser radiation is advantageous owing to the great selectivity it provides for detection only of those wave lengths of light radiations which were emitted through the transmitter bundles and detected after reflection on the surface. This can be done by using light filters having a very narrow passband at the output ends of the receiver bundles or by employing photo detectors such as photo resistances of the cadmium sulphide type which will selectivity detect only those radiations emitted by the laser source.

Thus it will be realized that a technique has been provided which extends the flexibility of use of optical converters particularly for measuring thicknesses of transparent bodies. Moreover, the use of a laser beam in connection with these converters provides various advantages when working under severe conditions such as in the presence of parasitic radiations or variable reflectivities, which may be encountered in the manufacture of glass.

What is claimed is:

1. Apparatus for producing at least one signal varying as a function of the distance from a reference face of the apparatus to a light reflecting surface comprising:
   a coherent light source;
   optical guide transmitter means having an emitting end at the reference face for transmitting a beam of coherent light rays from said source all with the same selected oblique incidence toward a surface so as to be reflected therefrom;
   optical guide receiver means having first and second receiving ends and first and second output means for transmitting a first flux of light issued from said emitting end and reflected by the surface from said first receiving end to said first output means to produce a first corresponding signal related to the distance from the reference face to the surface within one finite distance range outside which substantially no such first signal can be obtained, and for transmitting a second flux of light issued from said emitting end and reflected by the surface from said second receiving end to said second output means to produce a second corresponding signal related to the distance from the reference face to the surface within a second finite distance range outside which practically no such second signal can be obtained and which has an overlap section with said first finite range.
   said first and second receiving ends being laterally arranged with respect to said emitting end for producing said first and second corresponding signals which vary linearly with distance with equal but opposite rates of variation within the overlap section of said first and second ranges for at least one value of said selected oblique incidence of said coherent light rays to provide a function of the variations in reflectivity of the light reflecting surface within this overlap section.

2. The apparatus of claim 1, further including means for producing a third signal functionally related to the sum of said first and second corresponding signals, which is representative of the reflectivity of the light reflecting surface within the overlap section of said first and second ranges.

3. The apparatus of claim 1, further including means for producing a third signal functionally related to said first and second corresponding signals, which provides a representation of distance from said reference face to the light reflecting surface, which representation is corrected for variations of reflectivity of the light reflecting surface.

4. The apparatus of claim 3, wherein said third signal producing means includes means for producing a fourth signal functionally related to the sum of said first and second corresponding signals and means for modifying a representation of said first signal in response to said fourth signal to produce said third signal.

5. The apparatus of claim 1, wherein said first and second output means include means for converting the first and second light fluxes into representative electrical signals to produce said first and second signals, said converting means having gains selected for producing said equal but opposite rates of variation.

6. A method for producing signals representative of the distance from a reference face to a light reflecting surface comprising the steps of:
   directing a parallel beam of coherent light through an emitting opening at the reference face toward one light reflecting surface opposite said emitting opening with an oblique angle of incidence;
   picking up light reflected by the one surface with one receiving means having one receiving opening in prescribed spatial relationship with respect to said emitting opening for transmitting one flux of the reflected light to one respective output means for producing one corresponding signal related to the distance from the reference face to the one surface, picking up light reflected by the one surface with another receiving means having another receiving opening in prescribed spatial relationship with respect to said emitting opening for transmitting another flux of the light reflected by the one surface to another respective output means to produce a corresponding other signal related to the distance from the reference face to the one surface, said prescribed spatial relationship being determined to produce a linear variation of the one corresponding signal with one slope and a linear variation of the other corresponding signal with an other slope, both slopes having equal values but opposite signs, within a common range of distance from the reference face to the one surface for at least one value of said oblique angle of incidence of said coherent light beam, to produce a function of variations of the reflectivity of the one surface.

7. The method of claim 6 further including: summing said one and other corresponding signals to obtain a signal varying with reflectivity and applying said reflectivity varying signal to correct one of said corresponding signals for variations of reflectivity to obtain an accurate indication of distance within said common distance range.

8. Apparatus for producing at least one signal varying as a function of the distance from a reference face of the apparatus to a light reflecting surface portion in a direction normal thereto comprising:

light transmitting guide means having a light admitting end and a light emitting end at the reference face for passing light from said admitting end to said emitting end and transmitting light emerging from said emitting end to a light reflecting surface portion substantially parallel to the reference face for reflection of the transmitted light thereby;

means for directing a collimated parallel beam of light toward said admitting end at an oblique incidence selected for transmitting rays of the light emerging from said emitting end all with essentially the same common angle of oblique incidence onto the reflecting surface portion;

light receiving guide means having one light receiving end and one light output end for passing light from said one receiving end to said one output end, said one receiving end being disposed with respect to said emitting end for picking up light reflected by the surface portion over one finite range of distance from the reference face to the surface portion, for any given value of the selected oblique incidence producing such a common angle of oblique incidence for the light rays transmitted from said emitting end onto the surface portion; and photodetecting means for converting one flux of the light passed by said light receiving guide means to said one output end thereof into one electrical signal varying with the distance from the reference face to the surface portion over said one finite distance range in accordance with a relationship represented by one curve having distance as a coordinate and characterized by having a peak section about the center portion of said one distance range, a non-linear initial section at one end of said range, a non-linear final section at the other end of said one range, said other end being at a greater distance than said one end along the distance coordinate, and first and second linear section having slopes of opposite signs, said first linear section connecting said initial section to said peak section and said second linear section connecting said peak section to said final section, whereby said one signal may vary linearly with distance over two distinct portions of said one finite range on either side of the center portion thereof.

9. The apparatus of claim 8, wherein said light receiving guide means further comprises a second light receiving end and a second light output end for passing light from said second receiving end to said second output end, said second receiving end being disposed with respect to said emitting end for picking up light reflected by the surface portion over a second finite range of distance from the reference face to he surface portion, which has an overlap section with said one finite range for at least one value of said selected oblique incidence producing such a common angle of oblique incidence for the light rays transmitted from said emitting end onto the surface portion, and wherein, said photodetecting means is further arranged for converting a second flux of the light passed by said light receiving guide means to said second output and thereof into a second electrical signal varying with the distance from said reference face to the surface portion over said second finite range in accordance with a relationship represented by a second curve characterized by plural sections defined in a similar manner as for said one curve and including a peak section, non-linear and final sections and first and second linear sections, the first linear section of said second curve having a section of the distance coordinate in common with the second linear section of said first curve within the overlap section of said first and second finite ranges.

10. The apparatus of claim 9, further including means for combining said one and said second electrical signals to produce a third signal which varies with the reflectivity of the surface portion independently of the variations of its distance within said common distance coordinate section.

11. The apparatus of claim 8 wherein, said light receiving guide means has a second receiving end and a second output end for passing light from said second receiving end to said second output end, said second receiving end being disposed with respect to said emitting end for picking up light reflected by the surface portion over a second finite range of distance from the reference face to the surface portion, said second range having no overlap with said first finite range for at least one value of said selected oblique incidence producing such a common angle of oblique incidence for the light rays transmitted from said emitting end onto the surface portion, and wherein said photodetecting means is arranged for converting a second flux of light passed by said light receiving guide means to said second output end thereof into a second electrical signal varying linearly with distance from the reference face to the surface over a portion of said second range and outside said first distance range.

12. Apparatus for measuring the thickness of a transparent body having a first and a rear face opposite a reference face of the apparatus, comprising:

light trasmitting guide means having a light admitting end and a light emitting end at the reference face for passing light from said admitting end to said emitting end to emerge therefrom toward the transparent body;

coherent light source means for a producing a collimated parallel light beam directed toward said light admitting end at an angle of oblique incidence selected for transmitting rays of the light emerging from said emitting end toward the front face of the transparent body with a common angle of oblique incidence substantially equal to the selected angle of oblique incidence of the coherent light beam onto said admitting end, whereby a first fraction of the emerging light rays may be reflected by the front face at a common angle of reflection and a second fraction of the emerging light rays may be refracted a first time by the front face to travel through said transparent body to its rear face to be reflected thereby and travel back through the transparent body to the front face to be refracted a second time thereby and emerge from the front face at a common angle of emergence measured with respect to the normal direction to the front face;

first light receiving guide means having a first light receiving end and a first light output end for passing a first flux of light picked up by said first receiving end to said first output end, said first receiving end being disposed with respect to said emitting end for picking up light rays from said first fraction reflected by the front face over a first finite range of distance from the reference face to the front face;

second light receiving guide means having a second light receiving end and a second light output end for passing a second flux of light picked up by said second receiving end to said second output end, said second receiving end being disposed with respect to said emitting end for picking up light rays from said second fraction reflected by the rear face and refracted by the front face over a second finite range of distance from the reference face to the rear face, said first and second distance ranges having no overlap for the selected angle of oblique incidence of the coherent light beam;

photodetecting means for converting said first and second fluxes into respective first and second electrical signals varying with the distances from said reference face to the front and to the rear face, respectively, over said first and second finite ranges in accordance with relationships represented by first and second respective curves having distance as a coordinate, each said curve including: a peak section about the center portion of the respective one of said first and second distance ranges, a non-linear initial section at one end of said respective one range, a non-linear final section at the other end of said respective one range, said other end being at a greater distance than said one end, and first and second linear sections having substantially equal slopes of opposite signs, said first linear section connecting said initial section to said peak section and said second linear section connecting said peak section to said final section, the first linear sections of said one and second curves having substantially the same slope and being displaced from one another along the distance coordinate by an amount equal to the average thickness of the transparent body, the second linear sections of said one and second curves having substantially te same slope, and the initial section of said second curve being separated from the final section of said first curve along said distance coordinate by a zone along which no such first or second signal can be obtained; and means for combining said first and second electrical signals to produce a third signal representative of the difference between distances from said reference face to the rear face and to the front face of the transparent body respectively, whereby am accurate measurement of the thickness of the transparent body can be obtained with substantially no light reflected by the front face interfering on said second signal.

13. A method for producing a signal representative of the distance from a reference face to one light reflecting surface portion comprising:

directing a beam of light rays having all a same selected angle of incidence onto an admitting end of light transmitting guide means having an opposite light emitting end at the reference face for transmitting light rays emerging therefrom with essentially a same common oblique angle of incidence onto said one surface portion to be reflected thereby at a common angle of reflection;

receiving reflected light rays with one light receiving guide means having one light receiving end disposed with respect to said emitting end for picking up rays of the light reflected at said common angle of reflection over one predetermined finite range of distance from the reference face to said one reflecting surface portion for the selected angle of incidence; and passing the light rays picked up by said one receiving end through said one light receiving guide means for producing one signal having a magnitude varying with the distance from the reference face to said one light reflecting surface over said one finite distance range in accordance with a relationship represented by one curve characterized by a peak section substantially in the central portion of said one distance range, a non-linear initial section at one end of said one range and a non-linear final section at the other end of said one range, and first and second linear sections having substantially opposite slopes, said first linear section connecting said initial section to said peak section and said second linear section connecting said peak section to said final section.

14. The method of claim 13 further comprising the steps of transmitting light rays emerging from said light emitting end onto a second light reflecting surface portion to be reflected thereby, said second surface portion being substantially parallel to said one surface portion and spaced further away than said one surface portion with respect to said reference face;

receiving light reflected by said second surface portion with second light receiving guide means having a second light receiving end disposed with respect to said emitting end for picking up rays of the light reflected by said second surface portion over a second predetermined finite range of distance from the reference face to said second surface portion which does not overlap said one finite range for the selected angle of incidence; and passing the light rays picked up by said second receiving end through said second light receiving guide means for producing a second signal having a magnitude varying with the distance from the reference face to said second light reflecting surface over said second finite distance range in accordance with a relationship which is linear over at least one portion of said second range.

15. The method of claim 14, wherein said one and second surface portions belong to the front and rear faces of a trasparent body opposite said reference face and further comprising the step of producing a third signal functionally related to said one and second signals which is representative of the distance between said front and said rear faces of the transparent body to obtain a representative of the thickness thereof.

16. The method of claim 15, wherein said transparent body is a transparent plate floating on a light reflecting bath of liquid material.

17. The method of claim 14, further including the step of modifying the selected angle of incidence while still producing light rays emerging from said emitting end which have a common oblique angle of incidence onto the one surface portion for achieving a fine adjustment of portions of said first and second ranges over which said one and second signals vary linearly with distance from said reference face to said one and second surface portions respectively.

18. The method of claim 13, further including the steps of:

receiving light rays reflected by the one surface portion with a second light receiving guide means having a second light receiving end disposed with respect to said emitting end for picking up rays of the light reflected at said commong angle of reflection over a second predetermined finite range of distance from the reference face to said one reflecting surface portion, said first and second ranges having an overlap section; and passing light rays picked up by said second receiving end through said second light receiving guide means for producing a second signal having a magnitude varying with the distance from said reference face to said one surface portion over said second finite distance range in accordance with a relationship represented by a second curve characterized by a plurality of sections defined like those of said one curve and including a peak section, nonlinear initial and final sections, and first and second linear sections, said one signal varying in accordance with at least a portion of the second linear section of said one curve when said second signal varies in accordance with at least a portion of the first linear section of said second curve within the overlap section of said distance ranges.

19. The method of claim 18, wherein said one surface portion belongs to the front or the rear face of a transparent plate floating on a light reflecting bath.

20. The method of claim 13 further including using a source of coherent light for producing said directed beam of light rays.

21. The method of claim 20, wherein said one surface portion belongs to one of the front and rear faces of a transparent plate floating on a bath of a melted light reflecting medium, further including the step of detecting in the light passed through said one light receiving means only that portion having a selected wave length present in the coherent light beam.

* * * * *

UNITED STATES PATENT OFFICE
CERTIFICATE OF CORRECTION

PATENT NO. : 3,792,928
DATED : February 19, 1974
INVENTOR(S) : Jean-Loup Poilleux It is certified that error appears in the above-identified patent and that said Letters Patent are hereby corrected as shown below:

IN THE HEADING:

The spelling of the Assignee's name should be
-- Compteurs-Schlumberger --.

Signed and Sealed this

Twenty-fourth Day of August 1976

[SEAL]

Attest:

RUTH C. MASON
Attesting Officer

C. MARSHALL DANN
Commissioner of Patents and Trademarks